Dec. 15, 1931.    C. F. VAN HOOK    1,836,208
SPOOL ADJUSTING DEVICE
Filed Nov. 4, 1930

Charles F. Van Hook
INVENTOR
BY Wilbur M. Stone
his ATTORNEY

Patented Dec. 15, 1931

1,836,208

UNITED STATES PATENT OFFICE

CHARLES F. VAN HOOK, OF PATERSON, NEW JERSEY, ASSIGNOR TO THE WATSON MACHINE COMPANY, OF PATERSON, NEW JERSEY, A CORPORATION OF NEW JERSEY

SPOOL ADJUSTING DEVICE

Application filed November 4, 1930. Serial No. 493,281.

This invention relates to planetary stranding machines, and more particularly to a device for adjusting spools in cradles or flyers used in such machines.

In planetary stranding machines of the type herein considered, if space exists between the spool hub and the cradle hub, allowing the spool longitudinal freedom on its spindle, this freedom results in an excessive impact load on the cradles as the machine rotates; and regardless of the weight of the cradles, it is only a question of time when they are destroyed or show ruptures and distortions due to the sledge-hammer action of the spool against the side of the cradle due to the longitudinal freedom on the spindle.

In mounting a spool on a cradle, it is also essential that the spool drop into position with a certain amount of ease, and the assembling operation should be such as to require only the services of an unskilled laborer without trouble and loss of time.

It is an object of this invention to provide an adjusting device for preventing longitudinal movement of spools on their spindles during the rotation of the cradle.

A further object is the provision of an adjusting device for spools on cradles of planetary stranding machines, which device may be readily manipulated by unskilled persons without loss of time.

Figure 1:
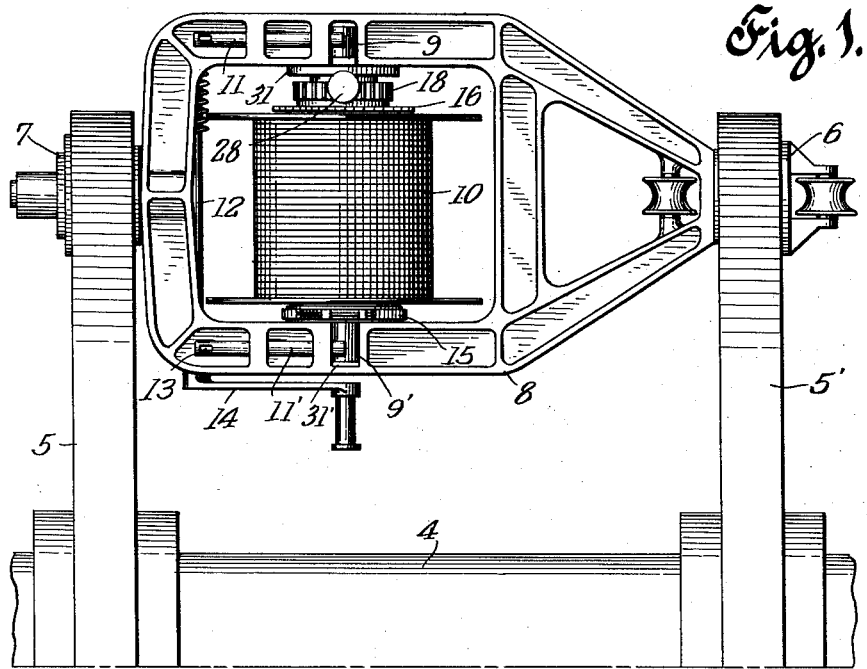
Figure 2:
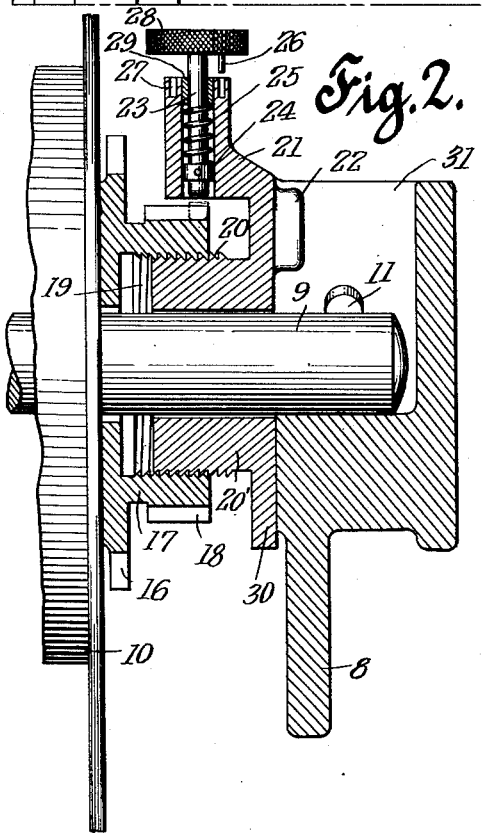
Figure 3:
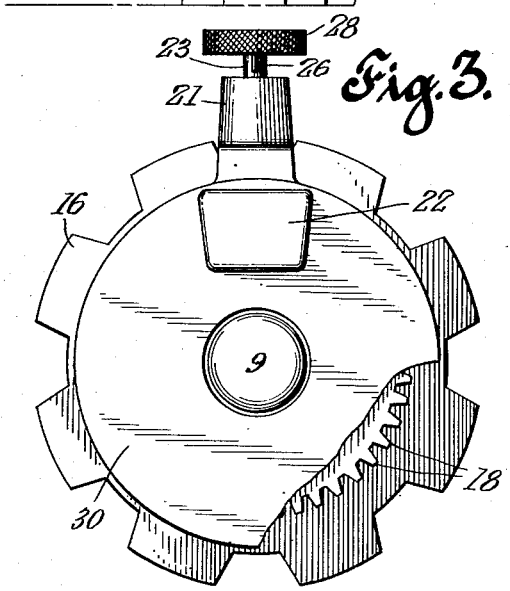

These and other objects are attained by the novel construction, combination and arrangement of parts hereinafter described and shown in the accompanying drawings, constituting a material part of this disclosure and in which:

Figure 1 is a plan view of a planetary stranding machine cradle in which the invention is embodied. Fig. 2 is a sectional view showing details of the spool adjusting device. Fig. 3 is an end view of the adjusting device.

Referring to the drawings, in Fig. 1 is shown a shaft 4 of a planetary stranding machine, which shaft carries the rotating frame having the heads 5 and 5', in which are journalled the trunnions 6 and 7 of a cradle 8. Trunnion 7 and shaft 4, may be geared together by known means, not shown, for imparting rotary movement to the cradle 8 while the whole cradle revolves about shaft 4.

Spool 10 is mounted for rotation in the cradle, and is provided with opposite trunnions 9 and 9' which are seated in bearings 31 and 31' in opposite side members of the cradle. The trunnions 9 and 9' are locked in the bearings by bolts 11 and 11', which rest over the trunnions. The bolts 11 and 11' are provided with slots which receive lugs 13 projecting from a shaft 12, which may be rotated by a crank arm 14 to move the bolts to an unlocking position.

The adjusting device is shown in detail in Fig. 2, and comprises an outer collar 17 having a flange provided with plurality of projections 16 on its periphery, while the periphery of the collar is provided with teeth 18. The collar is internally threaded at 19 with a buttress thread which engages a similar thread 20 on the inner collar 20'. The buttress thread gives the advantage of full shearing area as a V thread, and also maximum bearing area between the faces taking thrust as on a square thread.

The inner collar 20' has a lug 22 which rests in the bearing space 31, and a projecting portion 21 having a recess in which is slidably positioned a plunger 23, carrying a collar 24 against which bears a compression spring 25, the latter also bearing against a plug 29 in the upper end of the recess.

The plunger 23 has a knurled knob 28 from which downwardly projects a pin 26, adapted to fit into one of the recesses 27 in the projection 21. The inner collar 20' has a flat surface 30 which bears against the flat surface of the side member of the cradle adjacent the bearing 31.

In operation, the device may be mainipulated entirely by hand, no tools being necessary. In placing a spool in position, the outer collar 17 is rotated by engaging the projections 16 with the fingers to draw the outer collar 20' inwardly slightly to allow the trunnion 9 to drop easily in the bearing 31, the plunger 23 having previously been moved to the position shown in Fig. 2. The outer collar 17 is then rotated in the opposite direction by means of the projections 16 to force the inner collar 20' outwardly to cause the plate 30 to engage the side member of the cradle. Since the manipulation is entirely by hand, the engagement of the plate 30 with the side member will not be too tight. When the last adjustment has been made, the plunger 23 is moved down to engage one of the teeth 18, and rotated to cause the pin 26 to enter one of the recesses 27, to maintain the adjustment. The crank 14 is then moved downwardly, Fig. 1, to throw the bolts 11 and 11' into locking position over the trunnions 9 and 9'.

The foregoing disclosure is to be regarded as descriptive and illustrative only, and not as restrictive or limitative of the invention, of which, obviously, an embodiment may be constructed including modifications without departing from the general scope herein indicated and denoted in the appended claims.

Having thus described my invention, what I claim as new and desire to secure by Letters Patent, is:

1. In a device of the character described, a spool having a trunnion, a rotatable cradle having a recess in one of its sides to receive the trunnion, an outer sleeve bearing against the spool and rotatably mounted on the trunnion, an internal sleeve in threaded engagement with the outer sleeve and adapted to bear against the side of the cradle, means to manipulate the outer sleeve by the fingers, and means on the inner sleeve to latch the inner sleeve to the outer sleeve.

2. In a device of the character described, a spool having a trunnion, a rotatable cradle having a recess in one of its sides to receive the trunnion, an outer sleeve bearing against the spool and rotatably mounted on the trunnion, an internal sleeve in threaded engagement with the outer sleeve and adapted to bear against the side of the cradle, projections on the outer sleeve to enable it to be rotated by the fingers, teeth on the outer sleeve, and a spring pressed plunger carried by the inner sleeve to engage the teeth to latch the inner sleeve to the outer sleeve.

3. In a device of the character described, a spool having a trunnion, a rotatable member having a recess to receive the trunnion, a sleeve member bearing against the spool and rotatably mounted on the trunnion, a second sleeve member in threaded engagement with the first sleeve member, means to rotate the first sleeve member, and positive means to latch the sleeve members together.

4. In a device of the character described, a spool having a trunnion, an outer sleeve bearing against the spool, an inner sleeve in threaded engagement with the outer sleeve, and positive means to latch the sleeves together.

In witness whereof, I hereby affix my signature this 31st day of October, 1930.

CHARLES F. VAN HOOK.